United States Patent
Osepowicz et al.

(10) Patent No.: US 10,003,091 B2
(45) Date of Patent: Jun. 19, 2018

(54) PHOSPHORIC ACID FUEL CELL COMPONENT HAVING A POLYMER IMPREGNATED REGION

(71) Applicant: Doosan Fuel Cell America, Inc., Atlanta, GA (US)

(72) Inventors: Nicholas Edward Osepowicz, Broad Brook, CT (US); Manish Khandelwal, South Windsor, CT (US)

(73) Assignee: DOOSAN FUEL CELL AMERICA, INC., South Windsor, CT (US)

( * ) Notice: Subject to any disclaimer, the term of this patent is extended or adjusted under 35 U.S.C. 154(b) by 415 days.

(21) Appl. No.: 14/766,994

(22) PCT Filed: Feb. 19, 2013

(86) PCT No.: PCT/US2013/026675
§ 371 (c)(1),
(2) Date: Aug. 11, 2015

(87) PCT Pub. No.: WO2014/130011
PCT Pub. Date: Aug. 28, 2014

(65) Prior Publication Data
US 2015/0380747 A1    Dec. 31, 2015

(51) Int. Cl.
*H01M 8/0284* (2016.01)
*H01M 8/086* (2016.01)
(Continued)

(52) U.S. Cl.
CPC .......... *H01M 8/0284* (2013.01); *H01M 4/86* (2013.01); *H01M 4/8605* (2013.01);
(Continued)

(58) Field of Classification Search
CPC ............ H01M 8/0271; H01M 8/0273; H01M 8/0276; H01M 8/028; H01M 8/0284; H01M 8/0286; H01M 8/086
See application file for complete search history.

(56) References Cited

U.S. PATENT DOCUMENTS

| | | |
|---|---|---|
| 4,233,369 A | 11/1980 | Breault et al. |
| 4,687,715 A | 8/1987 | Michael |

(Continued)

FOREIGN PATENT DOCUMENTS

| | | |
|---|---|---|
| JP | 60000064 | 5/1985 |
| JP | 2001216996 A | 8/2001 |

OTHER PUBLICATIONS

International Preliminary Report on Patentability for International application No. PCT/US2013/026675 dated Sep. 3, 2015.
(Continued)

*Primary Examiner* — Alix E Eggerding
(74) *Attorney, Agent, or Firm* — Carlson, Gaskey & Olds

(57) ABSTRACT

According to an example embodiment, a method of making a phosphoric acid fuel cell component includes situating at least one polymer film layer against a permeable component layer. The polymer film layer comprises a polymer that is chemically resistant to phosphoric acid. The polymer film layer is melted. The permeable component layer is impregnated with the melted polymer to thereby establish a region on the component layer that is impermeable to phosphoric acid. The impregnated region also provides a seal against reactant leakage from the component.

14 Claims, 1 Drawing Sheet

(51) Int. Cl.
  *H01M 4/86*   (2006.01)
  *H01M 8/023*  (2016.01)
  *H01M 8/0286* (2016.01)
  *H01M 8/0234* (2016.01)

(52) U.S. Cl.
  CPC ......... *H01M 8/023* (2013.01); *H01M 8/0286* (2013.01); *H01M 8/086* (2013.01); *H01M 8/0234* (2013.01); *Y02P 70/56* (2015.11)

(56) References Cited

U.S. PATENT DOCUMENTS

| | | | |
|---|---|---|---|
| 6,410,177 | B1 | 6/2002 | Iyasu et al. |
| 8,197,990 | B2 | 6/2012 | Burdzy et al. |
| 2004/0112532 | A1 | 6/2004 | Yandrasits et al. |
| 2005/0100776 | A1* | 5/2005 | Brunk ................. C25B 9/10 429/481 |
| 2010/0021777 | A1* | 1/2010 | Gottesfeld .......... H01M 4/8807 429/429 |
| 2012/0028160 | A1 | 2/2012 | Kanuri et al. |
| 2012/0052403 | A1* | 3/2012 | Tatematsu ........... H01M 8/1027 429/408 |

OTHER PUBLICATIONS

Extended European Search Report for Application No. EP 13 876 049.1 dated Aug. 3, 2016.
International Search Report and Written Opinion of the International Searching Authority for International application No. PCT/US2013/026675 dated Oct. 24, 2013.

* cited by examiner

PHOSPHORIC ACID FUEL CELL COMPONENT HAVING A POLYMER IMPREGNATED REGION

BACKGROUND

Fuel cells are useful for generating electricity based on an electrochemical reaction. Several components of the fuel cell are designed to facilitate the electrochemical reaction. One of the challenges associated with operating a fuel cell is maintaining an adequate seal at various locations within the cell stack assembly. For example, it is desirable to maintain the reactants in the chemically active portion of the fuel cell to realize the electrochemical reaction. In the case of a phosphoric acid fuel cell, it also is desirable to maintain the phosphoric acid in appropriate locations within the cell stack assembly. Various proposals have been made to address such concerns, however, some of them may not provide adequate sealing performance while others introduce undesired additional expense into the cost of a fuel cell system.

SUMMARY

According to an example embodiment, a method of making a phosphoric acid fuel cell component includes situating at least one polymer film layer against a permeable component layer. The polymer film layer comprises a polymer that is chemically resistant to phosphoric acid. The polymer film layer is melted. The permeable component layer is impregnated with the melted polymer to thereby establish a region on the component layer that is impermeable to phosphoric acid.

An example embodiment of a phosphoric acid fuel cell component is made by the example process.

According to an example embodiment, a phosphoric acid fuel cell component includes a permeable component layer having a perimeter region that is impregnated with a polymer material that is chemically resistant to phosphoric acid. The perimeter region provides a seal against flow of fluid through the perimeter region.

The various features and advantages of at least one disclosed example embodiment will become apparent to those skilled in the art from the following detailed description. The drawings that accompany the detailed description can be briefly described as follows.

DETAILED DESCRIPTION

Figure 1:
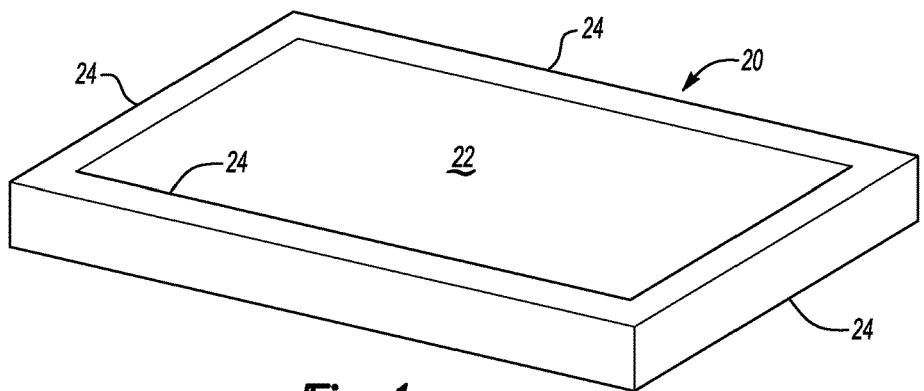
FIG. 1 diagrammatically illustrates a fuel cell component designed according to an embodiment of this invention.

FIG. 1 schematically shows a phosphoric acid fuel cell component 20. In this example, the component 20 comprises a porous, graphitized substrate 22 with a polymer impregnated region 24. In the illustrated example, the polymer impregnated region 24 is situated around a periphery of the component 20. The polymer impregnated into the region 24 is chemically resistant to phosphoric acid and provides a seal against phosphoric acid movement through or across the region 24. The seal provided by the impregnated region 24 is also useful for controlling outboard reactant leaks (e.g., in-plane movement out of the substrate). The impregnated region 24 in the illustrated example is a seal to prevents reactant leaks and phosphoric acid leaks. In some embodiments less than the entire periphery includes an impregnated region. For example, some components have a two-sided or three-sided seal. In such embodiments, at least the side or portion of the component that includes the region 24 is a sealed side or portion of the component.

The example component 20 may be used as an electrode in a phosphoric acid fuel cell. In some examples, the component 20 comprises a gas diffusion layer.

Figure 2A:
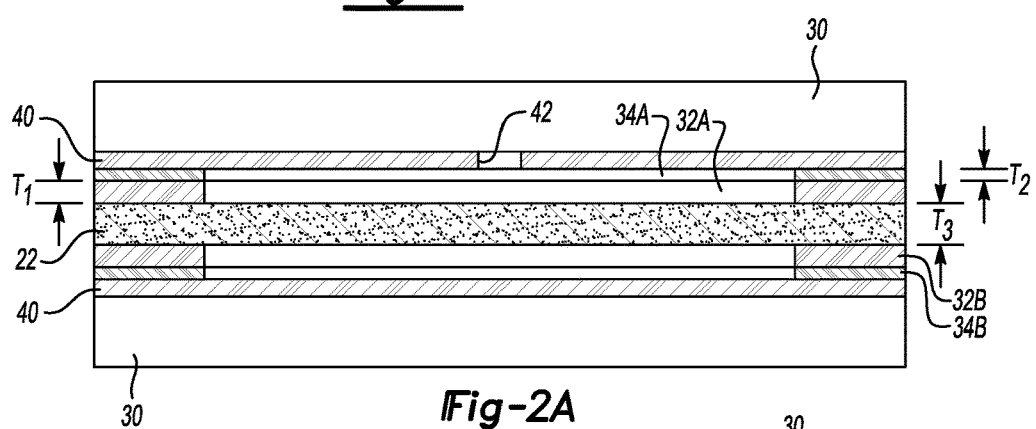
FIGS. 2A and 2B schematically illustrate an arrangement and method for making a fuel cell component according to an embodiment of this invention.
Figure 2B:
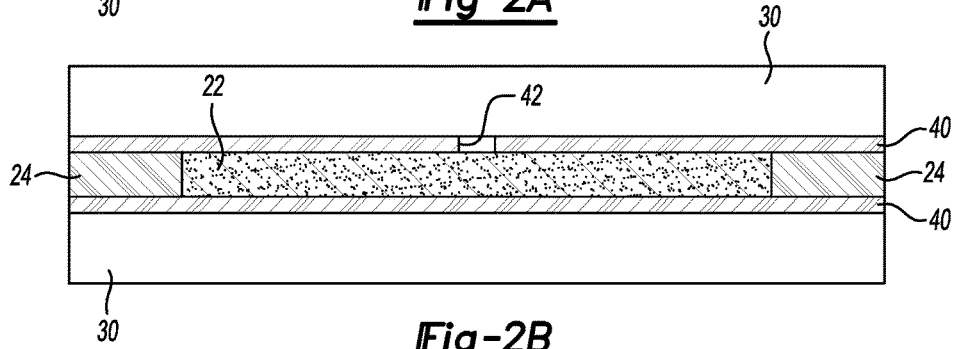

FIGS. 2A and 2B schematically illustrates an arrangement and method for making a phosphoric acid fuel cell component such as the component 20 shown in FIG. 1. In this example, a heated press includes plates 30, which may comprise graphite for example. The porous substrate 22 is situated between the plates 30 with at least one polymer film layer situated against the substrate 22. In the example of FIG. 2A, four separate polymer film layers are situated between the plates 30. Polymer film layers 32A and 32B are situated directly against the substrate 22 on opposite sides of the substrate 22. Additional polymer film layers 34A and 34B are included in this example. In some situations, a desired thickness of the polymer film layers may be achieved by using a single polymer film layer on each side of the substrate 22. Depending on commercially available film thicknesses, some examples include providing multiple polymer film layers to achieve a desired thickness.

Figure 3:
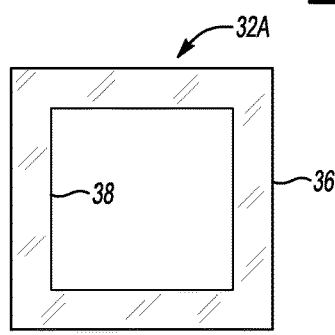
FIG. 3 is an elevational view of an example polymer film layer.

FIG. 3 illustrates an example configuration of the example polymer film 32A. An exterior perimeter 36 of the film layer 32A corresponds to the exterior of the substrate 22. An interior perimeter 38 establishes a width of the film (i.e., between the perimeters 36 and 38). The interior perimeter 38 is situated to establish a surface area of the polymer film 32A. The total surface area of the polymer film 32A is less than the total surface area of the substrate 22. The interior perimeter 38 may be selected to correspond to the outside border of the chemically active region of the substrate 22 so that the polymer impregnated into the substrate 22 does not hinder or interfere with the electrochemical reaction that is desired within a fuel cell incorporating the component 20.

Example materials useful as a polymer film are commercially available, such as PEEK™ and Teflon™ (e.g. PFA). The polymer material in the disclosed example is a high melt flow, thermally stable, non-wetting material that is chemically resistant to phosphoric acid. The high melt flow characteristics of the material corresponds to a minimum of 0.25 g/10 mins per ASTM D2116. The example polymer material is thermally stable below 220° C.

Given the particular substrate characteristics of a particular fuel cell arrangement, those skilled in the art who have the benefit of this description will be able to select an appropriate polymer film material to meet their particular needs.

While the example of FIG. 3 shows a frame-type configuration of the polymer film 32A, it is also possible to use a plurality of strips or L-shaped film pieces and to position them appropriately adjacent the substrate to realize a desired configuration of the polymer impregnated region 24.

As can be appreciated from FIG. 2A, the polymer film layers 32A and 32B have a first thickness $T_1$. The polymer film layers 34A and 34B have a second, smaller thickness $T_2$. The substrate 22 has a third thickness $T_3$. The desired total thickness of all of the polymer films involved in the manufacturing process corresponds to a porosity of the substrate 22 multiplied by the thickness $T_3$ of the substrate 22. The minimum thickness of the polymer films (collectively if there are multiple layers) is approximately equal to the product of the porosity and the third thickness $T_3$. In some examples, the porosity of the substrate 22 is not entirely consistent across the entire substrate. One example embodiment includes using the maximum porosity of the substrate to determine the desired polymer film thickness. Using the maximum porosity assists in establishing an adequate seal in the region 24.

In the illustrated example, $T_1+T_2$ is approximately equal to one-half of the porosity of the substrate 22 multiplied by the thickness of the substrate 22. Providing the film layers 32 and 34 on each side of the substrate 22 yields a total thickness of the polymer films that correspond to the porosity of the substrate 22 multiplied by the thickness $T_3$ of the substrate 22.

One feature of the example of FIG. 2 is that a thicker polymer film layer is placed closer to the substrate 22 than another polymer film layer that is thinner. The layers 32A and 32B are thicker than the layers 34A and 34B and, therefore, the layers 32A and 32B are placed against the substrate 22. Situating thinner films further from the substrate 22 facilitates more uniform melting and distribution of the polymer used to impregnate the region 24 in some examples.

Figure 4:
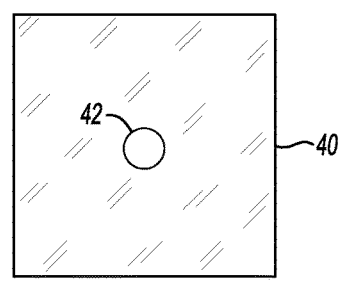
FIG. 4 is an elevational view of an example release film layer.

For purposes of facilitating an easy release of the impregnated substrate from between the plates 30, release films 40 are included between the most exterior polymer film layers and the plates 30. As shown in FIG. 4, an example release film 40 includes at least one opening 42 within the film. The opening 42 facilitates allowing gases to escape from between the release films 40 included in the example of FIGS. 2A and 2B. Allowing gases to escape in this way avoids any undesired variations or defects along the substrate 22 and, in particular, the polymer impregnated region 24.

During the manufacturing process, the substrate 22, polymer film layers 32 and 34 and release films 40 are compressed between the plates 30 as shown in FIG. 2A. A first pressure is applied to the layers between the plates 30 while the layers are heated up until at least the polymer film layers 32 and 34 reach a melting temperature of the polymer. In one example, the first pressure is less than 100 psi. After the melting temperature has been reached at a coldest portion of the polymer film layers, the pressure is increased while temperature increases to a second temperature that exceeds the melting temperature of the polymer. In one example, 100 psi pressure is used while increasing the temperature of at least the polymer material until that temperature is approximately 20° C. higher than the melting temperature of the polymer. A ten percent tolerance is acceptable in some examples (e.g., the temperature reached while applying the second, higher pressure may be between 18° and 22° above the melting temperature of the polymer). In some examples, the higher pressure and higher temperature is applied for a time on the order of one minute. Those skilled in the art that have the benefit of this disclosure will be able to choose an appropriate temperature and time to meet their particular needs for their selected polymer and component configuration.

The second pressure and increased pressure causes the plates 30 to move closer together as shown in FIG. 2B. As a result of the high temperature and the pressure applied, the polymer material of the polymer films melts and impregnates the substrate 22 to establish a phosphoric acid-impermeable region 24 along the portions of the substrate 22 where the polymer films were applied.

Manufacturing a fuel cell component utilizing the principles of this description may provide significant cost savings associated with the otherwise labor-intensive approach to providing an acid (and other fluid) barrier within a phosphoric acid fuel cell.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making a phosphoric acid fuel cell component, comprising the steps of:
   situating at least one polymer film layer comprising a polymer that is chemically resistant to phosphoric acid against a permeable component layer;
   melting the polymer film layer;
   applying a first pressure to the polymer and component layer until a temperature of at least the polymer reaches a melting temperature of the polymer; and
   applying a second, greater pressure to the polymer and component layer while increasing a temperature of at least the polymer to a second temperature above the melting temperature of the polymer; and
   impregnating the permeable component layer with the melted polymer to thereby establish a region on the component layer that is impermeable to phosphoric acid.

2. The method of claim 1, comprising situating the polymer film along at least a portion of a perimeter of the component layer.

3. The method of claim 1, comprising
   using a plurality of polymer film layers that includes at least one polymer film layer that is thicker than at least one other of the polymer film layers; and
   situating the thicker one of the polymer film layers between the component layer and the at least one other of the polymer film layers.

4. The method of claim 1, comprising
   placing the polymer film layer and the permeable component layer within a press;
   situating the polymer film layer between the press and the permeable component layer; and
   situating a release film between the polymer film layer and the press.

5. The method of claim 4, comprising providing a vent through the release film for allowing gas to escape from between the release film and the other layers.

6. The method of claim 1, wherein the second temperature is approximately 20° C. higher than the melting temperature of the polymer.

7. The method of claim 1, wherein the polymer film layer comprises a high melt flow polymer that is non-wetting and thermally stable below a temperature of approximately 220° C.

8. The method of claim 1, wherein
   the polymer film layer comprises a frame that has a geometry corresponding to a perimeter of the component layer; and
   the polymer film layer has a surface area that is less than a surface area of the component layer.

9. The method of claim 1, wherein the polymer film layer has a thickness corresponding to at least a porosity of the substrate multiplied by a thickness of the substrate.

10. The method of claim 1, wherein the component layer comprises at least one of an electrode, a gas diffusion layer and a catalyst layer.

11. The method of claim 1, comprising situating a first polymer film layer against one side of the component layer and a second polymer film layer against an oppositely facing side of the component layer.

12. A phosphoric acid fuel cell component made by the process comprising the steps of:
   situating at least one polymer film layer comprising a polymer that is chemically resistant to phosphoric acid against a permeable component layer;
   melting the polymer film layer;
   applying a first pressure to the polymer and component layer until a temperature of at least the polymer reaches a melting temperature of the polymer; and
   applying a second, greater pressure to the polymer and component layer while increasing a temperature of at least the polymer to a second temperature above the melting temperature of the polymer; and
   impregnating the permeable component layer with the melted polymer to thereby establish a region on the component layer that is impermeable to phosphoric acid.

13. The phosphoric acid fuel cell component of claim 12, wherein the process comprises
   using a plurality of polymer film layers that includes at least one polymer film layer that is thicker than at least one other of the polymer film layers; and
   situating the thicker one of the polymer film layers between the component layer and the at least one of the other polymer film layers.

14. The phosphoric acid fuel cell component of claim 12, wherein the process comprises
   placing the polymer film layer and the permeable component layer within a press;
   situating the polymer film layer between the press and the permeable component layer;
   situating a release film between the polymer film layer and the press; and
   providing a vent through the release film for allowing gas to escape from between the release film and the other layers.

* * * * *